US 8,943,836 B2

(12) United States Patent
Rose et al.

(10) Patent No.: US 8,943,836 B2
(45) Date of Patent: Feb. 3, 2015

(54) COMBINED CYCLE POWER PLANT

(75) Inventors: Steven Andrew Rose, Cypress, TX (US); Christopher James Doyle, Carlsbad, CA (US)

(73) Assignee: NRG Energy, Inc., Princeton, NJ (US)

( * ) Notice: Subject to any disclaimer, the term of this patent is extended or adjusted under 35 U.S.C. 154(b) by 793 days.

(21) Appl. No.: 12/501,304

(22) Filed: Jul. 10, 2009

(65) Prior Publication Data

US 2011/0006529 A1   Jan. 13, 2011

(51) Int. Cl.
| | |
|---|---|
| F02C 6/18 | (2006.01) |
| F01K 23/10 | (2006.01) |
| F01K 7/06 | (2006.01) |
| F01K 3/24 | (2006.01) |

(52) U.S. Cl.
CPC . *F01K 7/06* (2013.01); *F01K 3/245* (2013.01); *F01K 23/10* (2013.01); *Y02E 20/16* (2013.01)
USPC .......................................... 60/772; 60/39.182

(58) Field of Classification Search
USPC ............................................. 60/39.182, 772
See application file for complete search history.

(56) References Cited

U.S. PATENT DOCUMENTS

| | | | |
|---|---|---|---|
| 3,204,407 A * | 9/1965 | Karl-Heinz Schuller et al. ............................ | 60/39.182 |
| 5,078,205 A * | 1/1992 | Bodas et al. .................... | 165/110 |
| 5,357,746 A | 10/1994 | Myers et al. | |
| 5,375,410 A | 12/1994 | Briesch et al. | |
| 5,624,235 A * | 4/1997 | Siga et al. .................... | 416/241 R |
| 5,632,143 A * | 5/1997 | Fisher et al. ................ | 60/39.182 |
| 5,839,269 A * | 11/1998 | Frutschi ...................... | 60/39.182 |
| 5,896,740 A | 4/1999 | Shouman | |
| 6,065,283 A * | 5/2000 | Shouman .................... | 60/39.182 |
| 6,141,952 A | 11/2000 | Bachmann et al. | |
| 6,145,295 A | 11/2000 | Donovan et al. | |
| 6,230,480 B1 * | 5/2001 | Rollins, III ................ | 60/39.182 |
| 6,442,924 B1 | 9/2002 | Talley et al. | |

(Continued)

FOREIGN PATENT DOCUMENTS

| | | |
|---|---|---|
| EP | 0889204 A3 | 9/2001 |
| JP | H05-141267 A | 6/1993 |

(Continued)

OTHER PUBLICATIONS

Siemens, Industrial Steam Turbines, 2009, pp. 1-8.*
http://w3.windfair.net/wind-energy/news/4051, Nov. 22, 2007, "Siemens to supply wind and steam turbines for renewable energy projects in Spain".*

(Continued)

*Primary Examiner* — Ted Kim
(74) *Attorney, Agent, or Firm* — John R. Thompson; Stoel Rives LLP

(57) ABSTRACT

Disclosed herein are embodiments of combined cycle power plants having elevated exhaust pressure from a steam turbine. The elevated exhaust pressure from the steam turbine may result in an elevated condensate pressure and temperature. A cooling system removes sensible heat from the condensate. The elevated condensate temperature results in a greater temperature difference between the condensate and the working medium in the cooling system. The amount of heat that is dissipated by the cooling system is proportionate to the heat transfer surface and the temperature difference between the condensate and the working medium. As a result of the greater temperature difference, a smaller cooling system configured to operate with a higher temperature condensate may be utilized in place of a larger cooling system configured to operate with lower temperature condensate. By reducing the size of the cooling system, the overall size of the combined cycle power plant may be reduced.

23 Claims, 1 Drawing Sheet

(56) References Cited

U.S. PATENT DOCUMENTS

| | | | |
|---|---|---|---|
| 6,895,740 B2* | 5/2005 | Erickson | 60/39.182 |
| 2002/0116930 A1* | 8/2002 | Anderson | 60/39.182 |
| 2003/0131601 A1 | 7/2003 | Baxter | |
| 2004/0148941 A1* | 8/2004 | Wylie | 60/39.182 |
| 2007/0071599 A1* | 3/2007 | Arai et al. | 415/200 |
| 2007/0169485 A1 | 7/2007 | Bellows et al. | |
| 2008/0087002 A1* | 4/2008 | Zhou | 60/39.182 |
| 2009/0145103 A1 | 6/2009 | Nakhamkin | |
| 2010/0005775 A1* | 1/2010 | Kipping | 60/39.182 |

FOREIGN PATENT DOCUMENTS

| | | |
|---|---|---|
| JP | H09-125912 A | 5/1997 |
| JP | H09-256815 A | 9/1997 |
| JP | H 11-22419 A | 1/1999 |
| JP | H 11-193704 A | 7/1999 |
| JP | 3082843 B2 | 8/2000 |
| JP | 2002-115507 A | 4/2002 |
| JP | 2004-068652 A | 3/2004 |
| JP | 2006-009574 A | 1/2006 |
| JP | 3974208 B2 | 9/2007 |

OTHER PUBLICATIONS

International Search Report and Written Opinion mailed Nov. 26, 2010 in PCT Application No. PCT/US2010/030747, filed Apr. 12, 2010.

International Preliminary Report on Patentability mailed Jan. 19, 2012, in PCT Application No. PCT/US2010/030747, filed Apr. 12, 2010, 5 pgs.

Authors: Michael McManus, et. al.; Title: Integrated Technologies that Enhance Power Plant Operating Flexibility; 17 pages, Date: Dec. 11, 2007—New Orleans, LA.

Author: Steve Blankinship, Title: You've Got Ten Minutes; Published in Power Engineering Magazine, 6 pages, Date: Aug. 2008, USA.

Author: Jusii Heikkinen, et. al.; Title: The need for flexible speed; 5 pages, Date: Mar. 2008, Power Engineering International, USA.

Author: Joshua Kovac; Title: Advanced SCG6-5000F Development; 19 pages, Power Gen International 2008.

Author: Emberger et. al, Title: Fast Cylcling Capability for new Plants and Upgrade Opportunities, 13 pages, 2005.

Author: Raymond Baumgartner, Title: Fast Work for the benson once-through HSRG, 6 pages, Feb. 21, 2004, Modern Power Systems.

\* cited by examiner

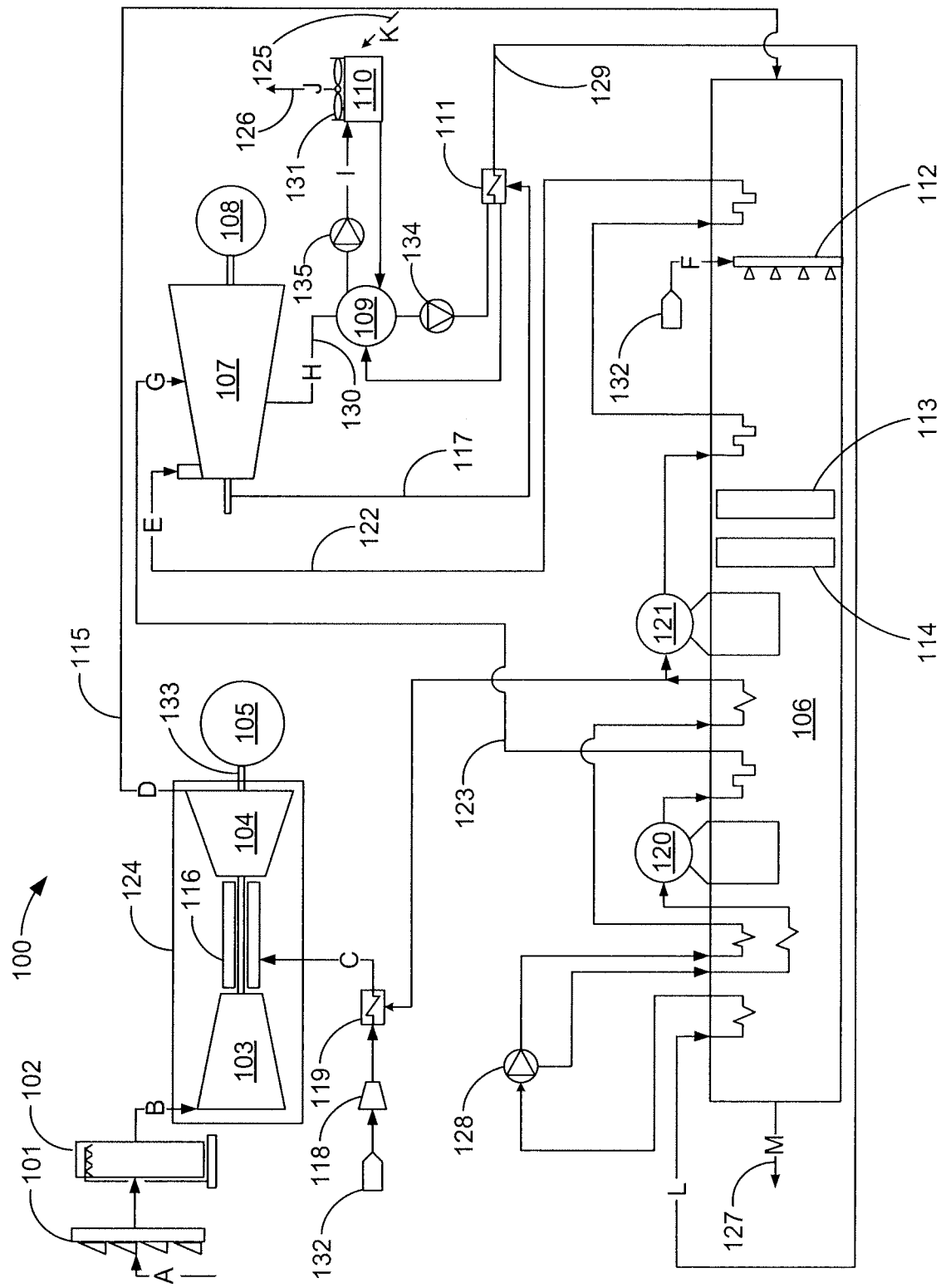

US 8,943,836 B2

COMBINED CYCLE POWER PLANT

TECHNICAL FIELD

The present disclosure relates to combined cycle power plants having an elevated exhaust pressure from a condensing steam turbine.

BRIEF DESCRIPTION OF THE DRAWINGS

FIG. 1 illustrates a simplified schematic of a combined cycle power plant according to one embodiment of the present disclosure.

DETAILED DESCRIPTION OF PREFERRED EMBODIMENTS

In the following description, numerous specific details are provided for a thorough understanding of the various embodiments of the invention. However, those skilled in the art will recognize that the invention can be practiced without one or more of the specific details, or with other methods, components, materials, etc. In addition, in some cases, well-known structures, materials, or operations may not be shown or described in detail in order to avoid obscuring aspects of the invention. Furthermore, the described features, structures, or characteristics may be combined in any suitable manner in one or more alternative embodiments.

Disclosed herein are embodiments of combined cycle power plants having elevated exhaust pressure from a steam turbine. The exhaust from the steam turbine may be condensed, cooled, and reused. The elevated exhaust pressure from the steam turbine may result in an elevated condensate pressure and temperature. In certain embodiments, sensible heat is removed from the condensate by an air cooled system. Air cooled systems may reduce water consumption by the combined cycle power plant and provide other advantages. The elevated condensate temperature results in a greater temperature difference between the condensate and the ambient air. The amount of heat that is dissipated by the air cooled system is proportionate to the heat transfer surface and the temperature difference between the condensate and the ambient air. As a result of the greater temperature difference, a smaller cooling system configured to operate with a higher temperature condensate may be utilized in place of a larger cooling system configured to operate with lower temperature condensate. By reducing the size of the cooling system, the overall size of the combined cycle power plant may also be reduced.

FIG. 1 is a simplified schematic of an exemplary combined cycle power plant 100. Combined cycle power plant 100 employs more than one thermodynamic cycle in order to generate electrical or mechanical power. In one embodiment, power plant 100 utilizes the Brayton cycle and Rankine cycle in combination.

In operation, combined cycle power plant 100 draws ambient air into an inlet filter 101. The air is then cooled in an evaporative cooler 102. Evaporative cooler 102 could be replaced with other forms of inlet air temperature reduction, such as fogging or chilling. From evaporative cooler 102 the air passes to a combustion turbine 124. Combustion turbine 124 incorporates an air compressor 103, a combustor 116, and a gas turbine 104. Air compressor 103 generates a flow of compressed air, which is fed to combustor 116. Combustor 116 adds a fuel to the flow of compressed air and combusts the fuel. Combustion turbine 124 may be embodied as a variety of commercially available systems, including model numbers 7FA.03, 7FA.04 and 7FA.05 available from General Electric, Co of Fairfield Conn.

Combustion of the fuel increases the temperature, velocity, and volume of the resulting combustion air flowing through combustion turbine 124. The combustion air is directed from combustor 116 to a gas turbine 104, where blades (not shown) interact with the combustion air to generate mechanical force. The mechanical force is used to power air compressor 103 and to provide useful work at a combustion turbine output 133. Combustion turbine output 133 of combustion turbine 124 may be coupled to an electrical generator 105, and the useful work generated by combustion turbine 124 may be converted into electrical power.

Fuel is supplied to combined cycle power plant 100 by a fuel supply 132. In certain embodiments, combined cycle power plant 100 may utilize natural gas or distillates as the fuel. Gas fuel is compressed by fuel compressor 118, and heated by fuel heater 119 before being provided to combustion turbine 124. In some embodiment, distillate fuels, such as #2 diesel and kerosene, may be used as a fuel for combustion turbine 124. In such embodiments, duct firing would ordinarily not be employed, and certain modifications known to one of skill in the art would be implemented in combined cycle power plant 100. Fuel heater 119 may receive a flow of steam or water extracted from the HRSG, or may receive heat from another source, from which heat may be transferred to the fuel.

The exhaust gas from combustion turbine 124 contains a significant amount of energy in the form of heat, which may be at least partially captured by a heat recovery steam generator (HRSG) 106. Exhaust gases from combustion turbine 124 may be carried by exhaust gas duct 115 to HRSG 106. HRSG 106 produces steam from the water and the exhaust gases that can be used to drive a steam turbine 107.

HRSG 106 is configured to produce steam at one or more pressure levels. In the illustrated embodiment, HRSG 106 generates both high-pressure steam and intermediate pressure steam. Water may be provided to HRSG 106 from the hotwell of condenser 109. A steam circuit connected to a high pressure drum 121 provides high pressure steam, and a steam circuit connected to intermediate pressure drum 120 provides intermediate pressure steam. In alternative embodiments, more or fewer pressure circuits may be provided. High pressure steam is delivered to steam turbine 107 via high pressure steam line 122, and intermediate pressure steam is delivered to steam turbine 107 via intermediate pressure steam line 123. Steam turbine 107 utilizes the high pressure steam and intermediate pressure steam to generate mechanical energy, which in turn may be transferred to generator 108. Generator 108 may convert the mechanical energy produced by steam turbine 107 into electrical power.

In certain embodiments, HRSG 106 includes a duct burner 112. Duct burner 112 adds additional heat to the exhaust gas flowing through HRSG 106. When duct burner 112 is in operation, HRSG 106 generates additional steam and increases the output of steam turbine 107. Heat that is not captured by HRSG is exhausted at HRSG outlet 127. HRSG 106 may include a selective catalytic reduction (SCR) system 114 to reduce nitrogen oxides and/or an oxidation catalyst system 113 to remove carbon monoxide.

In one embodiment, steam turbine 107 comprises a single case, non reheat unit, designed to operate with main steam conditions of approximately 1000 to 1400 psig and 1000° Fahrenheit. In addition, steam turbine 107 may be equipped with an uncontrolled admission point, to accept intermediate pressure steam at approximately 200 psig and 400° Fahrenheit. Steam turbine 107 may be designed to operate in a sliding pressure mode for efficient part load operation, with a minimum operating pressure of approximately 800 psig depending on HRSG 106 and steam turbine 107 limitations.

After passing through steam turbine 107, steam is exhausted via steam turbine exhaust line 130 to condenser 109. Condenser 109 condenses the steam to water by cooling. Condenser 109 operates in conjunction with a cooling system 110. A condenser water pump 135 may pump water between condenser 109 and cooling system 110. In condensing the steam, latent heat in the steam is transferred to condenser coolant. Cooling system 110 cools the condenser coolant. A variety of cooling systems known to one having skill in the art may be employed, including a surface condenser and either once-through cooling or a wet (or hybrid wet/dry) cooling tower; a direct contact spray condenser and dry cooling tower (the Heller System); or an air-cooled condenser. In the case of the Heller system, the condenser may also serve as a deaerator, and thus eliminating the need for the deaerator as a separate piece of equipment. A condensate pump 134 may transfer the cooled condensate to a gland steam condenser 111.

In the illustrated embodiment, cooling system 110 is an air cooled system. Ambient air 125 is drawn through cooling system 110 by cooling system fan(s) 131. In the process, ambient air 125 carries away excess heat in a flow of cooling system exhaust air 126. Cooled condensate from condenser 109 is returned via condensate return line 129 to HRSG 106. A boiler feed pump 128 may be used to pump water used by HRSG 106. By reusing cooled condensate, water consumption by combined cycle power plant 100 may be reduced.

In certain embodiments, combined cycle power plant 100 may be configured to bypass steam turbine 107, so as to allow for rapid startup. Accordingly, condenser 109 and cooling system 110 may be configured to accommodate fully bypassing steam turbine 107. In one embodiment, gas turbine 124 is capable of delivering 75% of its rated load within ten minutes of startup.

The pressure at which steam is exhausted from steam turbine 107 influences the temperature of the exhaust steam delivered to condenser 109. In combined cycle power plant 100 steam turbine 107 exhausts at an elevated pressure when compared to conventional combined cycle steam turbines. The elevated pressure at which steam is exhausted from steam turbine 107 results in a greater temperature difference of the resulting condensate with respect to ambient air temperature. This greater temperature difference may allow for a more compact design of cooling system 110, particularly where cooling system 110 is embodied as an air cooling system. A more compact design of cooling system 110 allows for a more economical operation by having a small system that is evacuated when combined cycle power plant 100 is not in operation. Further, the small system may allow for a more rapid startup. A quick start up time may provide advantages in circumstances when combined cycle power plant 100 is called upon for peaking service or load-firming service (i.e. combined cycle power plant 100 must respond quickly to satisfy peak demand or to compensate for changes in renewable energy generation, such as wind).

When steam turbine 107 is in operation, steam may leak from the glands. The leaked steam may be piped to gland steam condenser 111. Gland steam condenser condenses the gland steam, and directs the gland steam to condenser 109. The latent heat of condensation may add heat to the condensate. Gland steam may be delivered from steam turbine 107 to gland steam condenser 109 via a gland steam line 117.

The pressure of the steam exhaust is influenced by ambient temperature, the temperature of the incoming steam. In one embodiment the pressure of steam exhausted from steam turbine 107 when combustion turbine 124 is operating at full capacity and when ambient temperature is between 90 degrees Fahrenheit and 100 degrees Fahrenheit is between approximately eight PSIA and sixteen PSIA. The following table sets forth the results of four simulations calculating the heat balances in combined cycle power plant 100 under the conditions indicated. The letters indicated in the following table correspond to the points indicated in FIG. 1. Temperatures in Table 1 are given in degrees Fahrenheit, and pressures are given in PSIA.

TABLE 1

| Temp. | 90° F. | 90° F. | 100° F. | 100° F. |
|---|---|---|---|---|
| RH | 45% | 45% | 40% | 40% |
| Duct Fired | No | Yes | No | Yes |
| GT Load | 100% | 100% | 100% | 100% |
| A | Ambient air | Ambient air | Ambient air | Ambient air |
|  | 14.69 p | 14.69 p | 14.69 p | 14.69 p |
|  | 90 T | 90 T | 100 T | 100 T |
|  | 3301 m | 3301 m | 3237 m | 3237 m |
|  | 45% RH | 45% RH | 40% RH | 40% RH |
|  | MW 28.73 | MW 28.73 | MW 28.68 | MW 28.68 |
| B | 14.51 p | 14.51 p | 14.51 p | 14.51 p |
|  | 75.39 T | 75.39 T | 81.84 T | 81.84 T |
|  | 3312 m | 3312 m | 3250 m | 3250 m |
|  | 88.62% RH | 88.62% RH | 87.08% RH | 87.08% RH |
| C | 500 p | 500 p | 500 p | 500 p |
|  | 365 T | 365 T | 365 T | 365 T |
|  | 74.07 m | 74.07 m | 72.68 m | 72.68 m |
|  | LHV 21200 BTU/lb | LHV 21200 BTU/lb | LHV 21200 BTU/lb | LHV 21200 BTU/lb |
| D | 15.21 p | 15.24 p | 15.2 p | 15.22 p |
|  | 1143 T | 1143 T | 1149 T | 1149 T |
|  | 3386 m | 3386 m | 3323 m | 3323 m |
|  | MW 28.21 | MW 28.21 | MW 28.16 | MW 28.16 |
| E | 1000 p | 1298.6 p | 993.8 p | 1285.2 p |
|  | 1000 T | 1000 T | 1000 T | 1000 T |
|  | 1505.5 h | 1496.3 h | 1505.7 h | 1496.8 h |
|  | 550.7 M | 721.3 M | 547.2 M | 713.6 M |
| F |  | DB fuel LHV chemical |  | DB fuel LHV chemical |

TABLE 1-continued

|   |                | energy input<br>(77 F./25 C.)<br>182652 kBTU/h<br>Gas DT = 179.8 F. |                | energy input<br>(77 F./25 C.)<br>178113 kBTU/h<br>Gas DT = 178 F. |
|---|----------------|----------------|----------------|----------------|
| G | 160 p          | 197 p          | 158.9 p        | 195.3 p        |
|   | 401.6 T        | 407.9 T        | 401.1 T        | 407.5 T        |
|   | 1218.1 h       | 1215.4 h       | 1218 h         | 1215.5 h       |
|   | 56.43 M        | 31.43 M        | 55.47 M        | 31.61 M        |
| H | 8.014 p        | 12.82 p        | 10.04 p        | 15.75 p        |
|   | 182.9 T        | 205.2 T        | 193.4 T        | 215.5 T        |
|   | 1086.3 h       | 1097.4 h       | 1100.3 h       | 1111.7 h       |
|   | 606.9 M        | 752.5 M        | 602.4 M        | 745 M          |
|   | work = 69802 kW| work = 85380 kW| work = 66886 kW| work = 81461 kW|
|   | Gen. output =  | Gen. output =  | Gen. output =  | Gen. output =  |
|   | 68448 kWe      | 83873 kWe      | 65556 kWe      | 80002 kWe      |
|   | Exhaust loss = | Exhaust loss = | Exhaust loss = | Exhaust loss = |
|   | 3.239 BTU/lb   | 4.126 BTU/lb   | 4.107 BTU/lb   | 5.723 BTU/lb   |
|   | RPM = 3600     | RPM = 3600     | RPM = 3600     | RPM = 3600     |
| I | Hot CW         | Hot CW         | Hot CW         | Hot CW         |
|   | 182.9 T        | 205.2 T        | 193.4 T        | 215.5 T        |
|   | 28430 M        | 28297 M        | 28354 M        | 28208 M        |
| J | 148.9 T        | 163.9 T        | 159 T          | 174.6 T        |
|   | 39454 M        | 38507 M        | 58704 M        | 37791 M        |
|   | 8.679% RH      | 6.044% RH      | 8.073% RH      | 5.703% RH      |
|   | 86.93 T (WB)   | 89.81 T (WB)   | 91.38 T (WB)   | 93.99 T (WB)   |
| K | 163 T          | 180.7 T        | 173.5 T        | 191.1 T        |
|   | 28430 M        | 28297 M        | 28354 M        | 28208 M        |
| L | 48.34 p        | 49.65 p        | 51.83 p        | 53.54 p        |
|   | 184 T          | 206.1 T        | 194.5 T        | 216.4 T        |
|   | 152.2 h        | 174.3 h        | 162.7 h        | 184.7 h        |
|   | 636.1 M        | 782.5 M        | 631.2 M        | 774.4 M        |
| M | 246.8 T        | 247.4 T        | 253.2 T        | 255 T          |
|   | 3386 M         | 3395 M         | 3323 M         | 3331 M         |
|   | 18.29 ft^3/lb  | 18.34 ft^3/lb  | 18.5 ft^3/lb   | 18.58 ft^3/lb  |
|   | 17207 ft^3/s   | 17298 ft^3/s   | 17075 ft^3/s   | 17192 ft^3/s   |
|   | MW 28.21       | MW 28.16       | MW 28.16       | MW 28.1        |

As illustrated in Table 1, the pressure at point H, where steam is exhausted from steam turbine 107, ranges between 8.014 PSIA and 15.75 PSIA. Further, the condensate formed at point I by condenser 109 is between 182.9° F. and 215.5° F. Accordingly, in the simulations the condensate has a temperature difference of 92.9° F. and 115.5° F., respectively, with respect to the ambient air temperature. The large temperature difference between the condensate temperature and the ambient air may facilitate the use of a relatively compact cooling system 110.

The elevated exhaust pressure of steam turbine 107 may advantageously allow for minimizing the surface area of cooling system 110 because of the high difference between the condensate temperature and the air temperature that is being used to cool the condensate. If the condensing pressure were lower, then the size of cooling system 110 cooler would be larger, particularly where dry cooling is employed. Accordingly, in applications where a small footprint is required a higher condensing pressure results in a higher condensate temperature, which in turn results in a bigger temperature difference between the condensate and the air at the highest ambient air temperatures, which finally results in a small cooling system 110 to get the same heat rejection.

In one embodiment the elevated exhaust pressure at the output of steam turbine 107 may be achieved by reducing the number of stages in steam turbine 107. By removing, for example, the last stage blade and nozzles from steam turbine 107, the exhaust pressure of the turbine will be increased. The number of stages included in steam turbine 107 may be adjusted by one having skill in the art to realize an exhaust pressure of between approximately eight and sixteen PSIA. One having skill in the art will recognize that other techniques may also be employed for controlling the exhaust pressure of a steam turbine.

Combined cycle power plant 100 may afford greater flexibility in the placement of cooling system 110. In one embodiment, cooling system 110 operates by pumping condensate from the hotwell of condenser 109 into a plurality of external dry coolers. The plurality of dry coolers may be embodied as panels of radiators set in frames with cooling system fans 131 drawing air through the panels. The cooled condensate is returned to condenser 109. The sections of cooling system 110 may therefore be located at a convenient location on the site of combined cycle plant 100. The placement of dry cooling sections may be accomplished by pumping condensate underground to the desired location.

It will be obvious to those having skill in the art that many changes may be made to the details of the above-described embodiments without departing from the underlying principles of the invention. The scope of the present invention should, therefore, be determined only by the following claims.

We claim:

1. A combined cycle power plant comprising:
   a combustion turbine comprising:
      a compressor configured to generate compressed air using ambient air,
      a combustor to combust a fuel in the compressed air to produce combustion air, and
      a gas turbine to expand the combustion air to produce mechanical energy and exhaust gas;
   a heat recovery steam generator configured to receive the exhaust gas and transfer heat from the exhaust gas to water in order to generate a flow of steam;
   a condensing steam turbine configured to produce mechanical energy from the flow of steam, the condensing steam turbine comprising:

an input to receive the steam from the heat recovery steam generator (HRSG); and an output to output exhaust steam at a pressure between eight PSIA and sixteen PSIA, wherein the exhaust steam is output at an above atmospheric pressure of approximately sixteen PSIA when operating at a high ambient temperature, and wherein the exhaust steam is output at a below atmospheric pressure of approximately twelve PSIA when operating at a lower ambient temperature;

a condenser to receive the exhaust steam from the steam turbine and to condense the exhaust steam to form a condensate, wherein the condensate has a temperature above approximately 180 degrees Fahrenheit; and a dry cooling system coupled to the condenser and configured to cool the condensate in ambient temperatures between approximately 90 degrees Fahrenheit and 100 degrees Fahrenheit.

2. The combined cycle power plant of claim 1, wherein the steam from the HRSG has a temperature of approximately 1,000 degrees Fahrenheit.

3. The combined cycle power plant of claim 1, wherein the heat recovery steam generator further comprises a duct burner configured to add heat to the exhaust gas and increase its temperature.

4. The combined cycle power plant of claim 3, wherein the exhaust steam has a temperature above approximately 200 degrees Fahrenheit when the duct burner is operating at full capacity.

5. The combined cycle power plant of claim 3, wherein the output of the steam turbine is between twelve PSIA and sixteen PSIA when the duct burner is operating at full capacity.

6. The combined cycle power plant of claim 1, further comprising an electrical generator configured to convert the mechanical energy generated by the gas turbine to electrical energy.

7. The combined cycle power plant of claim 1, further comprising an electrical generator configured to convert the mechanical energy generated by the steam turbine to electrical energy.

8. The combined cycle power plant of claim 1, wherein the fuel comprises natural gas.

9. The combined cycle power plant of claim 1, wherein the fuel comprises distillate fuel.

10. The combined cycle power plant of claim 1, wherein the dry cooling system comprises a compact size configured to allow for rapid startup of the combined cycle power plant.

11. A combined cycle power plant comprising:
a combustion turbine comprising:
a compressor configured to generate compressed air in ambient temperatures between approximately 90 degrees Fahrenheit and 100 degrees Fahrenheit,
a combustor to combust a fuel in the compressed air to produce combustion air, and
a gas turbine to expand the combustion air to produce mechanical energy and exhaust gas;
a heat recovery steam generator configured to receive the exhaust gas and transfer heat from the exhaust gas to water in order to generate a flow of steam;
a condensing steam turbine configured to produce mechanical energy from the steam, the condensing steam turbine comprising:
an input configured to receive the steam from the heat recovery steam generator;
an output to output exhaust steam at a pressure between eight PSIA and sixteen PSIA when the gas turbine operates at full capacity, wherein the exhaust steam is output at an above atmospheric pressure of approximately sixteen PSIA when operating at a high ambient temperature, and wherein the exhaust steam is output at a below atmospheric pressure of approximately twelve PSIA when operating at a lower ambient temperature;
a condenser to receive the exhaust steam from the steam turbine and to condense the exhaust steam to form a condensate; and
an air cooled system coupled to the condenser and configured to cool the condensate.

12. The combined cycle power plant of claim 11, wherein the condensate has a temperature above approximately 180 degrees Fahrenheit.

13. The combined cycle power plant of claim 11, wherein the steam from the HRSG has a temperature of approximately 1,000 degrees Fahrenheit.

14. The combined cycle power plant of claim 11, wherein the heat recovery steam generator further comprises a duct burner configured to add heat to the exhaust gas and increase its temperature.

15. The combined cycle power plant of claim 14, wherein the exhaust steam has a temperature above approximately 200 degrees Fahrenheit when the duct burner is in operation.

16. The combined cycle power plant of claim 14, wherein the output of the steam turbine is between twelve PSIA and sixteen PSIA when the duct burner is operating at full capacity.

17. A method of operating a combined cycle power plant having a combustion turbine, a heat recovery steam generator, and a condensing steam turbine system, the method comprising the steps of:
operating said combustion turbine system to generate compressed air, to combust a fuel and a flow of exhaust gas, and to produce mechanical energy;
directing the flow of exhaust gas through the heat recovery steam generator to transfer heat from the exhaust gas to water in order to produce a flow of steam;
directing the flow of steam to the condensing steam turbine to generate mechanical energy from the flow of steam;
exhausting an exhaust steam from the condensing steam turbine at a pressure between eight PSIA and sixteen PSIA, wherein the exhaust steam is output at an above atmospheric pressure of approximately sixteen PSIA when operating at a high ambient temperature, and wherein the exhaust steam is output at a below atmospheric pressure of approximately twelve PSIA when operating at a lower ambient temperature;
directing the exhaust steam to a condenser, wherein the exhaust steam has a temperature above approximately 180 degrees Fahrenheit; and
dissipating excess heat from the condenser using a dry cooling system.

18. The method of claim 17, wherein the flow of steam to the condensing steam turbine has a temperature of approximately 1000 degrees Fahrenheit.

19. The method of claim 17, further comprising:
adding heat to the exhaust gas using a duct burner disposed within the heat recovery steam generator.

20. The method of claim 19, wherein the exhaust steam has a temperature above approximately 200 degrees Fahrenheit when the duct burner is operating at full capacity.

21. The method of claim 19, wherein the output of the steam turbine is between twelve PSIA and sixteen PSIA when the duct burner is operating at full capacity.

22. The method of claim 17, further comprising:
converting the mechanical energy generated by the gas turbine to electrical energy.

23. The method of claim 17, further comprising:
converting the mechanical energy generated by the steam turbine to electrical energy.

\* \* \* \* \*